UNITED STATES PATENT OFFICE.

AXEL FRANCK-PHILIPSON, OF CHICAGO, ILLINOIS.

SOLIDIFIED SOLUBLE COAL-TAR-DERIVATIVE DISINFECTANT.

1,282,062. Specification of Letters Patent. Patented Oct. 22, 1918.

No Drawing. Application filed March 15, 1918. Serial No. 222,579.

*To all whom it may concern:*

Be it known that I, AXEL FRANCK-PHILIPSON, subject of the King of Denmark, residing at Chicago, in the county of Cook and State of Illinois, have invented certain new and useful Improvements in Solidified Soluble Coal-Tar-Derivative Disinfectants; and I do hereby declare the following to be a full, clear, and exact description of the invention, such as will enable others skilled in the art to which it appertains to make and use the same.

This invention has for its object to provide a readily soluble disinfectant in the form of a solid mass adapted for easy shipment, containing a large proportion of a liquid coal-tar derivative of high disinfectant coefficiency whereby the solid mass attains such concentrated strength that a very small bulk thereof will produce a very large volume of a liquid disinfectant of standard strength. It has for its further object to provide a concentrated disinfectant in solid form of the character specified which will dissolve itself when immersed in water without stirring or agitating the latter, and will form a perfect and permanent emulsion with the water to which it is added.

The invention consists in the composition of ingredients hereinafter fully described and claimed.

The present product is preferably produced by the method or process described and claimed in my co-pending application for Letters Patent filed of even date herewith, Serial No. 222,580. It consists of neutralized tar oil in conjunction with a substantially neutral saponified fat consisting preferably of so-called solid oil such, for example, as cocoanut oil (which is preferred), stearic acid, and the like. In producing the mass the tar oil is preferably first admixed with the solution of caustic soda of a strength of about forty degrees Baumé, and is boiled with the same in the proportions of about seven parts tar oil to three parts of said solution for a period of one hour, more or less, during which time it is constantly stirred. This effects neutralization of the free acids of the tar oil. One part, more or less, of animal or vegetable fat to about three parts, more or less, of the first-named mixture is then added and boiling and stirring continued for a further period of ten to fifteen minutes, some further alkali, preferably caustic soda or soda ash, being added in sufficient quantity to saponify or partially saponify the fat.

The foregoing compound may then be poured into molds and allowed to cool, whereupon it solidifies into a stiff jelly-like mass which will not melt at a temperature less than about 120° Fahr., but which, when dropped into water, will dissolve itself by a species of eruption or effervescence and form a perfect and permanent emulsion with the water which may be used for cleansing and disinfecting surfaces and washing clothing and fabrics, and may also be applied to the skin of a person or animal without injurious effect.

The concentrated disinfecting co-efficiency of this solid mass is such that a very small quantity thereof dissolved in a relatively large volume of water, as, for example, one pound of the solid to fifteen to twenty gallons of water, will produce an emulsion of a standard disinfecting co-efficiency. This may be and is preferably increased by adding to the mixture prior to solidifying the same, and while either hot or cold, a saturated solution of a soluble disinfecting salt such as an oxalate of sodium or potassium equal in weight to one-fourth of one per cent. to two per cent. of the preceding compound which is thoroughly stirred into the same and becomes intimately intermixed therewith. The oxalate of sodium (or other non-caustic, non-etching and non-corrosive disinfectants adapted to the purpose substituted therefor), and increases the disinfecting co-efficiency of the mass to a very considerable extent so that a cake of the solid containing such oxalate or other equally efficient disinfecting salt will produce a larger volume of disinfectant emulsion than if the same or an equivalent is omitted.

The foregoing proportions are by weight and may be considerably varied according to the character of the animal or vegetable fat employed without departing from the invention as defined in the appended claims. The proportion of caustic soda or other suitable alkali used is preferably such that the finished product is substantially neutral, the volume of water used being determined by the length of time deemed necessary to effect thorough saponification of the fat before elimination by evaporation of more of the water than it is desired to retain in the finished product.

The finished product presents substantially it is believed a highly porous or cellular structure formed by the saponified fat, the pores or cells of which are filled with the neutralized tar-oil and other disinfectant added to the compound while still in liquid form. The proportion of the saponified fat to the neutralized tar oil is substantially one to three, and as the tar oil retains its liquid or substantially liquid state and very readily dissolves in and forms a perfect emulsion with water, a piece of the product dropped into water will dissolve very readily in that the minute globules of the neutralized tar oil will leave the cells in which they are held and thereupon the water will attack the walls of the latter and dissolve the saponified fat. The resulting emulsion is not only perfect and permanent but leaves neither sediment nor an oily floating film.

Preferably the finished product is of the consistency of stiff gelatin so that it will retain shape but be very easily cut or broken. It is thus adapted for shipment in paper cartons or other cheap suitable receptacles.

I claim as my invention:

1. A solidified soluble disinfectant comprising saponified fat commingled with tar oil the free acids of which have been neutralized and the latter constituting the major portion of the mass, the compound producing a stable emulsion with water.

2. A solidified soluble disinfectant comprising a tar oil, a fat, and alkali sufficient to neutralize the free acids of the tar oil and saponify or partially saponify the fat, the whole being thoroughly admixed and solidified and being capable of producing a stable emulsion with water.

AXEL FRANCK-PHILIPSON.